POSITIVE DISPLACEMENT ENERGY CONVERTING DEVICE

Filed July 10, 1961 10 Sheets-Sheet 1

INVENTOR.
JOHN P. RENSHAW
BY
Townsend and Townsend
attorneys

INVENTOR.
JOHN P. RENSHAW
BY
Townsend and Townsend
attorneys

Dec. 7, 1965 J. P. RENSHAW 3,221,717

POSITIVE DISPLACEMENT ENERGY CONVERTING DEVICE

Filed July 10, 1961 10 Sheets-Sheet 3

INVENTOR.
JOHN P. RENSHAW
BY
Townsend and Townsend
attorneys

INVENTOR.
JOHN P. RENSHAW
BY
Townsend and Townsend
attorneys

POSITIVE DISPLACEMENT ENERGY CONVERTING DEVICE

Filed July 10, 1961 10 Sheets-Sheet 5

INVENTOR.
JOHN P. RENSHAW
BY
Townsend and Townsend
attorneys

INVENTOR.
JOHN P. RENSHAW
BY Townsend and Townsend
Attorneys

POSITIVE DISPLACEMENT ENERGY CONVERTING DEVICE

Filed July 10, 1961 10 Sheets-Sheet 7

INVENTOR.
JOHN P. RENSHAW
BY
Townsend and Townsend
attorneys

POSITIVE DISPLACEMENT ENERGY CONVERTING DEVICE

Filed July 10, 1961

INVENTOR.
JOHN P. RENSHAW
BY
Townsend and Townsend
attorneys

INVENTOR.
JOHN P. RENSHAW
BY Townsend and Townsend
attorneys

POSITIVE DISPLACEMENT ENERGY CONVERTING DEVICE

Filed July 10, 1961 10 Sheets-Sheet 10

INVENTOR.
JOHN P. RENSHAW
BY
Townsend and Townsend
attorneys

United States Patent Office 3,221,717

Patented Dec. 7, 1965

3,221,717

POSITIVE DISPLACEMENT ENERGY CONVERTING DEVICE

John P. Renshaw, 340 Pine St., San Francisco, Calif.

Filed July 10, 1961, Ser. No. 127,431
4 Claims. (Cl. 123—13)

This invention relates to positive displacement rotary engines for delivering energy to, and/or receiving energy from fluids. Accordingly, the term engine, or energy converting device, as used herein encompasses devices for pumping and compressing fluids, devices which are driven by fluid under pressure, and combined devices where one delivers fluid under pressure to another or to an intermediate combustion chamber. More specifically the invention relates to engines in which compression and expansion chambers are provided between projections on a rotary power disk and one or more abutment disks which rotate in contact with the power disk and have recessed portions meshing with the projections on the power disk.

Positive displacement rotary engines of the type mentioned in the preceding discussion were known in general prior to this invention. In particular the co-pending application of John P. Renshaw, Serial No. 10,601, filed February 24, 1960, now United States Patent 3,012,551 granted December 12, 1961, discloses such an engine. In prior engines of the described type it has been customary to utilize a casing which encloses the abutment wheels in a fluid tight manner so they may be used to compress fluid for expansion against the power disk.

One of the objects of this invention is to provide a rotary positive displacement energy converting device of the type described having improved cooling features. This improvement is obtained by an arrangement which permits some or all of the abutment disks to operate substantially outside the gas sealed casing. In this way the abutment disks can be efficiently gas or liquid cooled. Not only are the abutment disks themselves thus directly cooled but in addition they can be employed according to the invention for circulating the cooling fluid over the outside of the casing which encloses the power disk. In addition by proper duct designs, the fluid circulated by the abutment disks outside the casing may be directionally controlled so as to provide useful fluid thrust and/or supercharging.

Another object of the invention is to provide a device of the type described in which relatively little power is required to drive the abutment disks. This object of the invention is particularly beneficial in connection with engines of the type proposed in said co-pending patent application wherein the peripheries of all of the disks have intermeshing teeth so that the abutment disks are necessarily at an angle to the power disk, the gear teeth must mesh with a sliding action which is less efficient than the straight pushing action which is obtained with the straight teeth on parallel gears. According to this invention the abutment wheels are vented during their rotation so they perform substantially no net compressing action against the power disk. In this way the power required to drive the abutment disks need principally only overcome friction forces, and very little power is lost in the gear system, and any compression stress is largely exerted by the main power shaft rather than by intermeshing synchronizing gear teeth.

An additional object of the invention is to provide a thrust bearing arrangement for resisting the lateral forces on the abutment disks and thus further reducing the power requirements of the abutment disks by reducing the friction losses.

Since the normally utilized compressing action of the abutment disks is eliminated according to the invention, a single engine unit does not lend itself to complete operation as an internal combustion engine, although it can operate very efficiently as a pump, compressor or fluid motor.

Accordingly, another object of the invention is to provide a system for utilizing said single engine unit as a combustion engine. This object is accomplished by connecting the single unit to a similar second unit (or any other adequate type of compressor) with one unit acting as a compressor and delivering a compressed fuel mixture to the other unit which is provided with spark or other means for firing the mixture. The expanding fluid drives the power disk of the expansion unit which is connected to and drives the power disk of the compression unit. As an alternative arrangement according to the invention, the compression unit delivers to a continuous combustion chamber which delivers to the expansion unit. Likewise, the compression unit may deliver only compressed air to the other unit, utilizing a separate pump system for fuel injection.

Another object of the invention is to provide a double unit system comprising a compression unit and an expansion unit wherein the abutment disks of the two units are arranged to permit close coupling of the units.

A further object of the invention is to provide sealing means which will substantially prevent the escape of compressed fluid, this feature being particularly adapted for cooperation with the vented provision of the abutment disks so that even though the abutment disks are vented the power disk remains sealed.

Another object of the invention is to provide a low-friction, sealing engagement between the gear teeth on the power and abutment disks. This feature is obtained in a very effective manner by offsetting the abutment disks with respect to the power disk as will be hereinafter described in detail.

An additional object of the invention is to employ the full-sealing feature of concave gear teeth as taught by the co-pending application in an improved manner which simplifies the shape of the casing for the power disk.

Other objects and features of advantage will be apparent from the following description read in conjunction with the accompanying drawings in which:

In the drawings:

FIG. 3 is a view of FIG. 1 after FIG. 1 is rotated slightly counterclockwise as viewed from the right.

Figure 1:
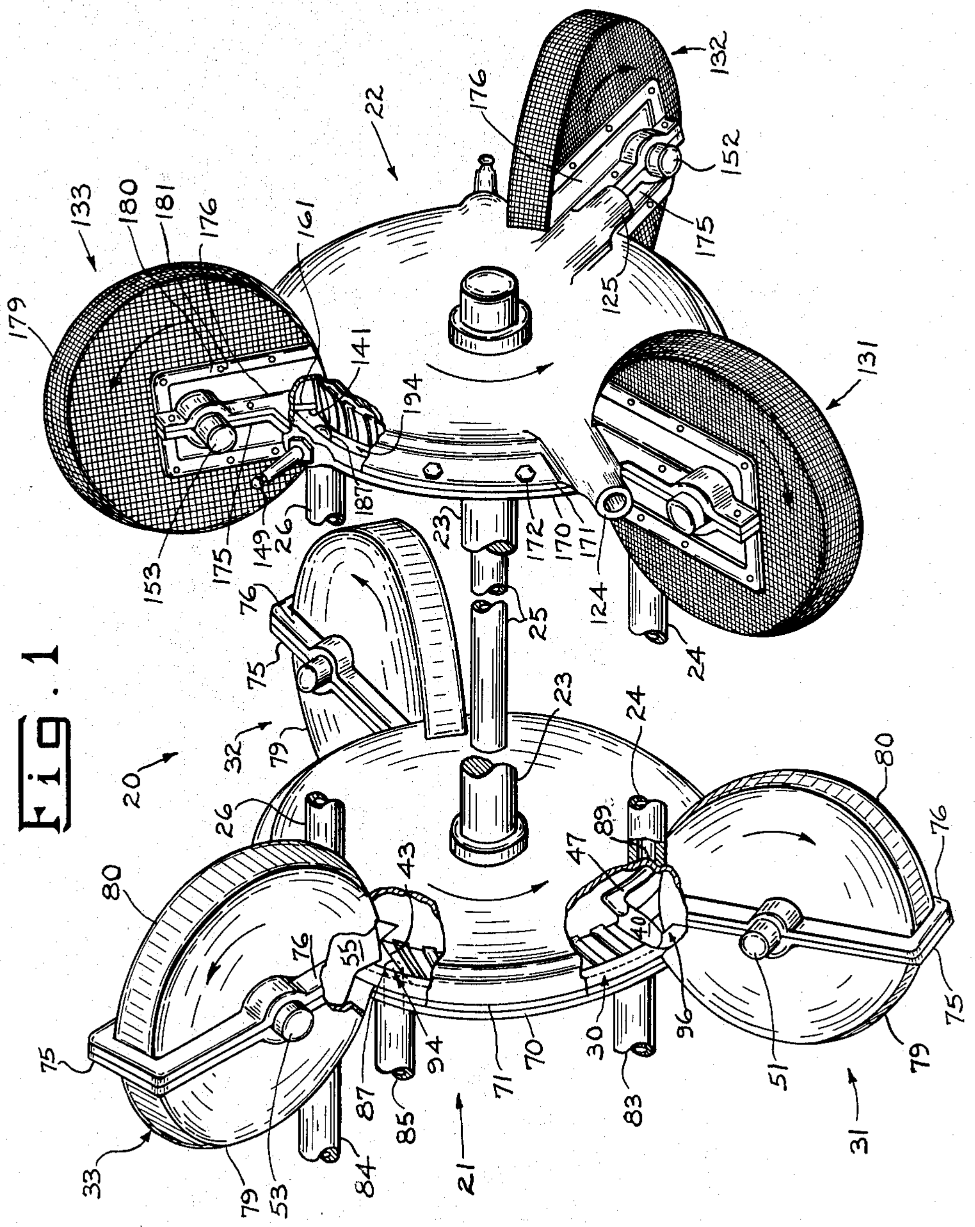
FIG. 1 is a perspective view of a device according to the invention in which a compression unit on the left delivers compressed fuel mixture to an expansion unit on the right and is driven by the expansion unit.

Referring to the drawings in more detail, FIGURES 1–4 disclose the invention embodied in an internal combustion engine system 20 comprising a compression unit 21 and an expansion unit 22. The units are connected by a common drive shaft 23 (or drive shaft system) and by connecting conduits 24, 25 and 26. The drive shaft and conduits are shown broken to clarify the disclosure. As will be understood by those skilled in the art the compression and expansion units are substantially separated for clear disclosure but can be much more closely coupled to conserve space and decrease the volume of the connecting conduit passages.

Figure 4:
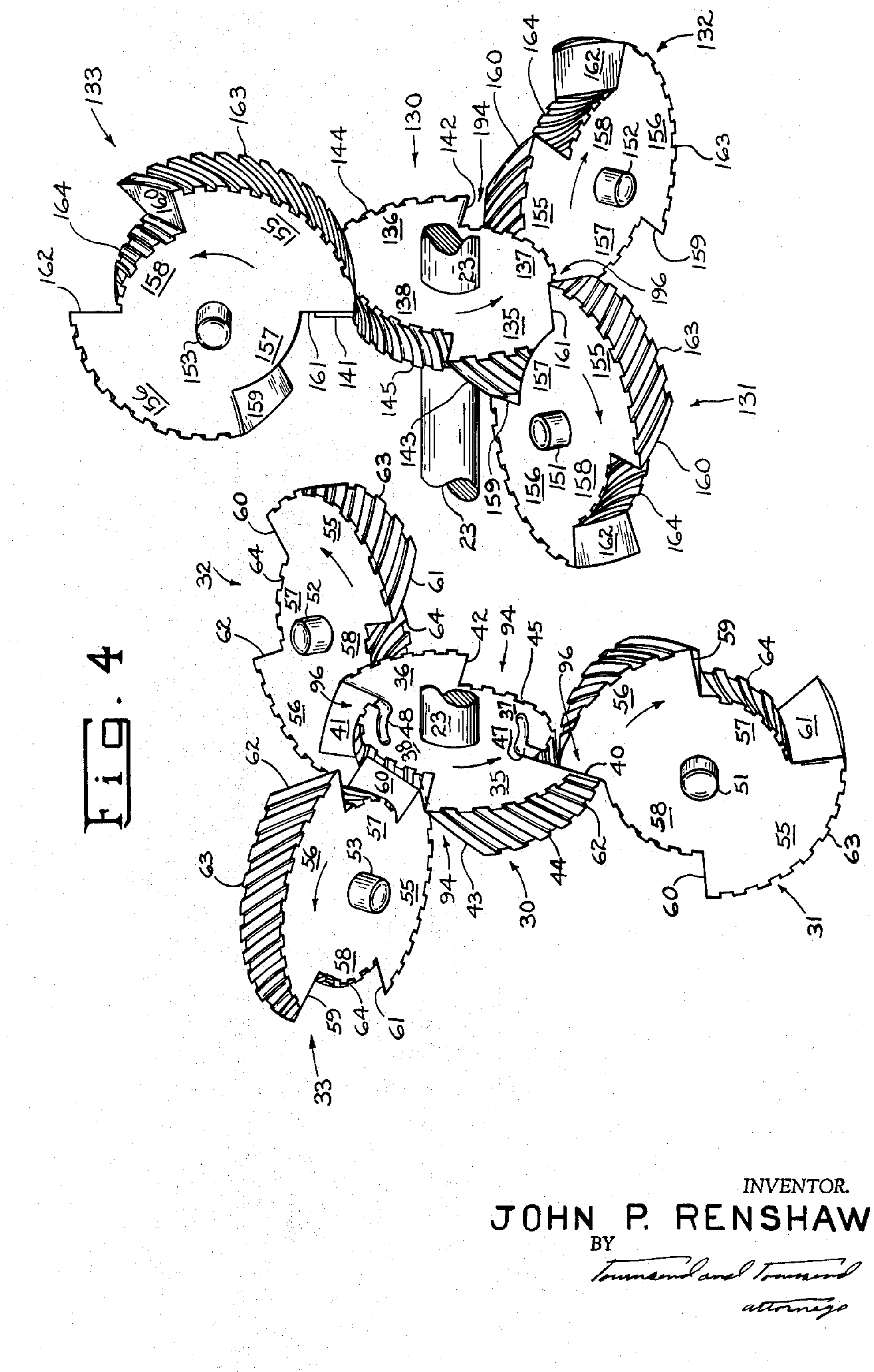
FIG. 4 is a perspective view of FIG. 3 with all casings removed to show all the gears in the rotational positions they occupy in FIG. 1.
Figure 14:
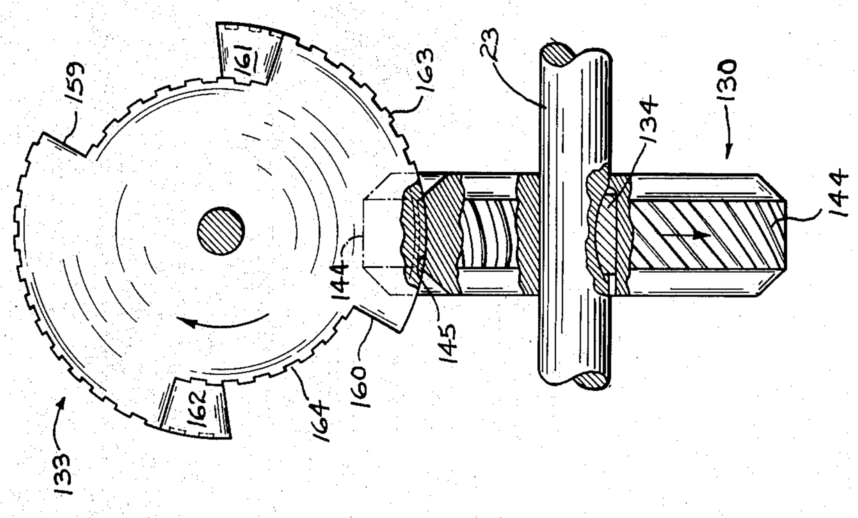
FIG. 14 is an edge view of an expansion power disk in mesh with one of the abutment disks, showing the concave gear meshing feature and also showing a widened power disk.

As shown best in FIGURES 1 and 4 the compression unit 21 comprises a compression power disk 30 and abutment disks 31, 32 and 33. As will be more fully described hereinafter, the abutment disks 31, 32 and 33 are not actually visible in FIGURE 1 and are protected by oversized casings. It is helpful for orientation purposes to indicate the location of the abutment disks by the same numerals as are used in FIGURE 4, for example. Power disk 30 is rigidly connected to shaft 23 as by conventional key means shown in FIGURE 14 for the expansion unit. As shown best in FIGURE 4, disk 30 has large radius sections or projections 35 and 36, and small radius sections or recessed portions 37 and 38. The large and small radius sections merge at beveled leading edges 40 and 41 and at beveled trailing edges 42 and 43. The periphery of each large radius section is provided with gear teeth 44, and the periphery of each small radius section is provided with gear teeth 45. The right face of compression power disk 30 is provided with outlet valve grooves 47 and 48 which open to the periphery of the small radius sections adjacent leading edges 40 and 41, respectively.

The abutment disks 31, 32 and 33 of the compression unit are rotatably mounted on short shafts 51, 52 and 53, respectively. The abutment disks are identical with each other, and each has large radius sections or projections 55 and 56, and small radius sections or recessed portions 57 and 58. The large and small radius sections merge at beveled leading edges 59 and 60, and at beveled trailing edges 61 and 62. The periphery of each large radius section is provided with gear teeth 63, and the periphery of each small radius section is provided with gear teeth 64.

The casing for the compression unit 21 comprises symmetrical half sections 70 and 71 shaped to provide an interior recess having walls closely fitting around the compression power disk 30. The shaft 23 is journaled in the center of the casing sections 70 and 71, and the peripheries of the sections are flattened to provide bolting rims. The rim on section 71 is drilled and tapped to receive bolts 72 (FIGURE 3) which are inserted through holes in the rim of section 70 so as to be accessible from the end of the device. Section 70 is provided with three casing half-sections for the abutment disk. Each half casing comprises a bolting rim 75 and a relatively thin wall section 79. Similarly section 71 is provided with three casing half-sections each having a bolting rim 76 and a wall section 80. The rims 75 and 76 are matched so that when casing halves 70 and 71 are joined the rims form bores for receiving the abutment disk shafts 51–53. The rims 75 and 76 are also secured together by bolts 72. A sealing gasket can be positioned between the bolting rims of the casing halves.

As previously stated, one of the features of the invention involves a decrease in the work performed by the abutment disks. More specifically, the abutment disks are not employed to compress fluid against the power disk. Accordingly, casing sections 79 and 80 could be eliminated. However, it is desirable to have the abutment disks shielded for safety of personnel and to protect the parts from damaging dirt particles. This can be accomplished with screens as will be explained in connection with the expansion unit 22. However, oversized casings are preferred for the compression unit abutment disks in order to avoid any possible escape of the fuel mixture which is compressed by the power disk 30. The abutment disks casings are oversized as shown best in FIGURES 5, 11 and 12 so that fluid can circulate freely in the space 81 between the outer periphery of the abutment disks and the inner periphery of the casings for the abutment disks. In this way the abutment disks are relieved of any appreciable compression work. If necessary in a particular installation the abutment disk casings could be modified to provide a moderate amount of compression, particularly for short periods of high demand.

Figure 9:
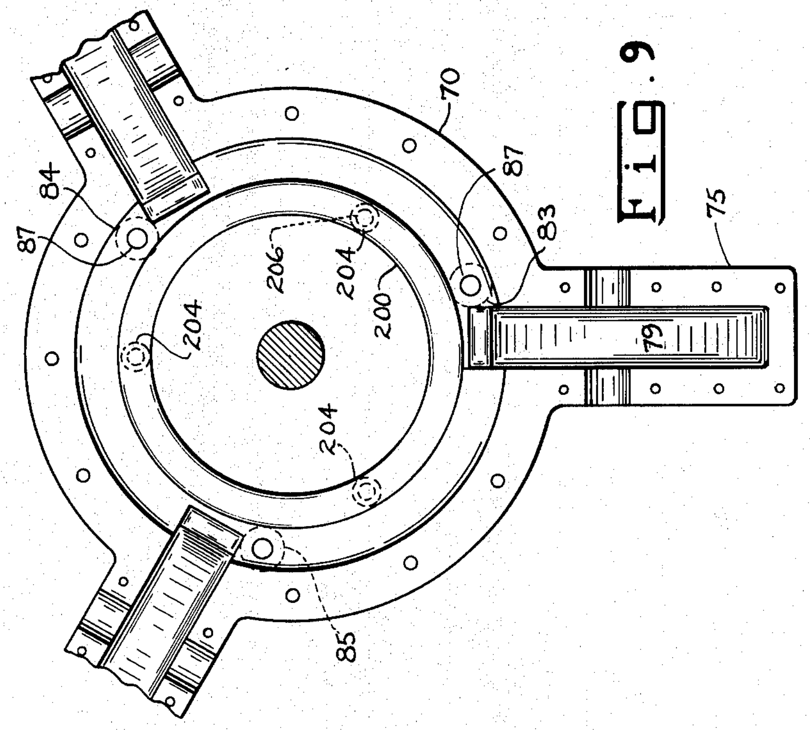
FIG. 9 is an interior view of the left half of the compression casing taken on the line 9—9 of FIG. 3, with the disks removed.
Figure 10:
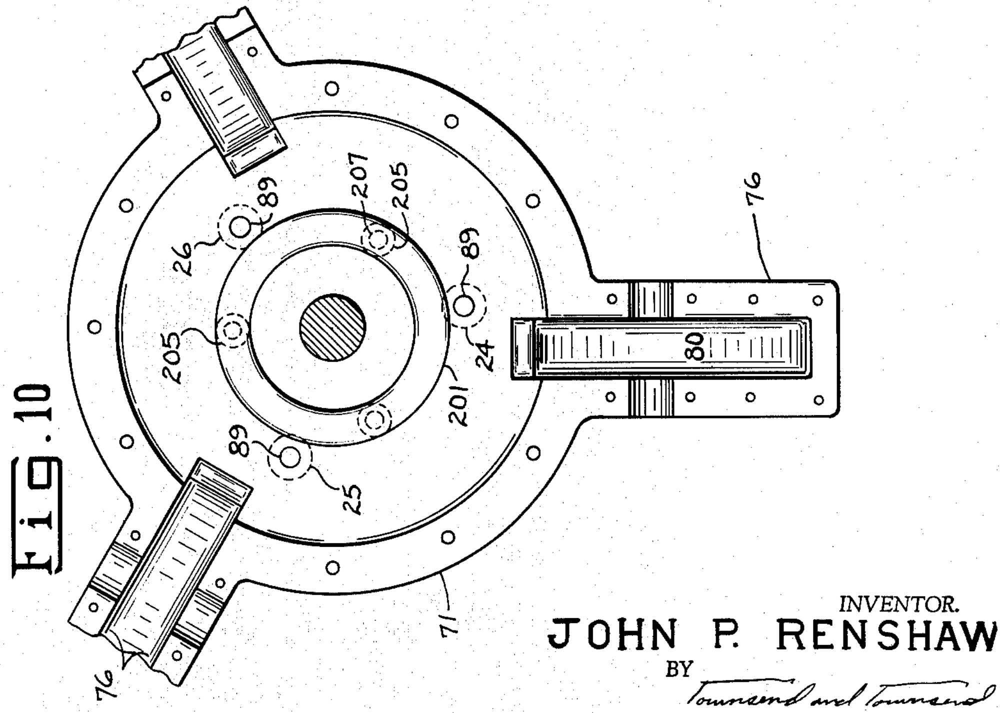
FIG. 10 is an interior view of the right half of the compression casing taken on the line 10—10 of FIG. 3 with the disks removed.

The casing section 70 is provided with three inlet tubes 83, 84 and 85 which are attached to the casing by welding or other conventional means. The distal ends of the inlet tubes can, of course, be joined to a suitable single manifold. Casing section 70 is drilled to provide inlet bores which register with the inlet tubes and open into the casing to provide inlet ports 87 as shown in FIGURES 1 and 9. The connecting conduits 24, 25 and 26 are connected to the casing section 71 by welding or other suitable means, and the casing section is drilled to provide outlet bores which register with the connecting conduits and open into the casing to provide outlet ports 89 as shown in FIGURES 1 and 10. Ports 89 also register with outlet valve grooves 47 and 48 as will be hereinafter explained in more detail in connection with FIGURES 5 and 6.

Figures 5, 6:
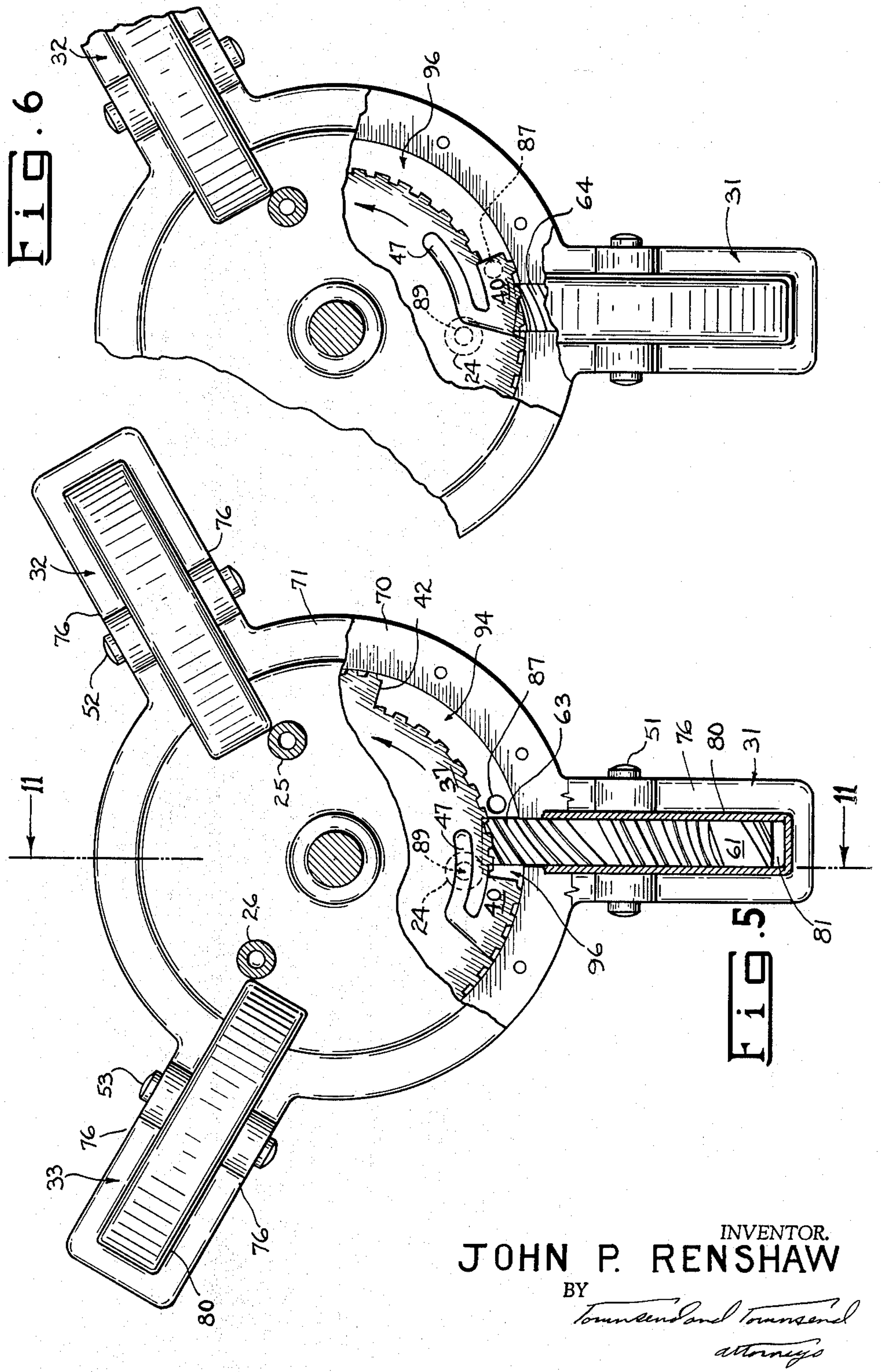
FIG. 5 is an end view of the compression unit taken on the line 5—5 of FIG. 3, with the casing broken away in part.
FIG. 6 is a view similar to FIG. 5 showing the power disk in a different position.

The operation of the compression unit is as follows, with particular reference to FIGURES 1, 2, 4, 5 and 6. The rotation of the various disks is considered to be in the direction shown by the arrows in the figures. When trailing edge 42 or 43 of power disk 30 passes any of the abutment disks, it uncovers one of the inlet ports 87. At the same time an expansion chamber 94 is formed between the walls of the casing, a small radius section 37 and 38 of the power disk, a large radius section 55 or 56 on one of the abutment disks, and a trailing edge 42 or 43 on the power disk. More specifically see the expansion chambers 94 in FIGURES 1, 4 and 5. As the power disk continues to rotate it draws in a full charge from the inlet port 87. When the trailing edge 42 or 43 which forms one end of the expansion chamber passes the next abutment disk, the abutment disk will enter the chamber and a compression chamber 96 is formed. The compression chamber is formed between the walls of the casing, the small radius section 37 or 38 of the power disk, the large radius section 55 or 56 on said next abutment disk, and a leading edge 40 or 41 on the power disk. More specifically, see compression chambers 96 in FIGURES 1, 4 and 5. In FIGURE 6 the chamber between leading edge 40 and trailing edge 42 has just been completely expanded or filled with fluid, and leading edge 40 has closed inlet 87 so that the chamber can operate as a compression chamber.

FIGURES 5 and 6 show the power disk 30 in two positions for clear illustration of the operation of the compression unit. FIGURE 5 shows the power disk in the same rotational position as in FIGURES 1 and 4, with outlet valve groove 47 registering with outlet port 89, and compressed fluid from compression chamber 96 being forced into conduit 24. In FIGURES 5 and 6, conduit 24 is shown in phantom since its portion of the casing has been cut away. FIGURE 6 is similar to FIGURE 5 except that it shows disk 30 rotated in the direction of the arrow to a position where the face of the power disk has just closed exhaust port 89. In FIGURE 5 the expansion chamber 94 is still expanding while in FIGURE 6 the inlet port 87 has just been closed by leading edge 40. It will be noted that outlet grooves 47 and 48 are relatively short so that some initial compression will occur before the outlet grooves communicate with outlet ports 89.

Although the expansion and compression operation has been discussed with particular reference to operation on each side of abutment disk 31, it will be apparent from the drawings that the same operation occurs on each side of the other abutment disks 32 and 33. Obviously, the same operations do not occur simultaneously at all abutment disks. For example in the positions shown in FIGURE 4, compression is taking place against one side of abutment disks 31 and 33, and expansion is occurring on the other side of disks 31 and 33. At the same time abutment disks 32 has its small radius teeth engaged with the power disk and is therefore not forming the end of any chamber. As the power disk 30 continues to rotate, disk 31 will next become inactive and disk 32 will start to form the ends of expansion and compression chambers while disk 33 continues to do so. Continued rotation of the power disk will render abutment disk 33 inactive while disks 31 and 32 are the active ones, and then the cycle will start over. Since the abutment disks 31, 32 and 33 are geared to the power disk 30, it will be obvious that all of the abutment disks will be rotated continuously by the power disk when the latter is rotated by some external force such as shaft 23.

Figure 2:
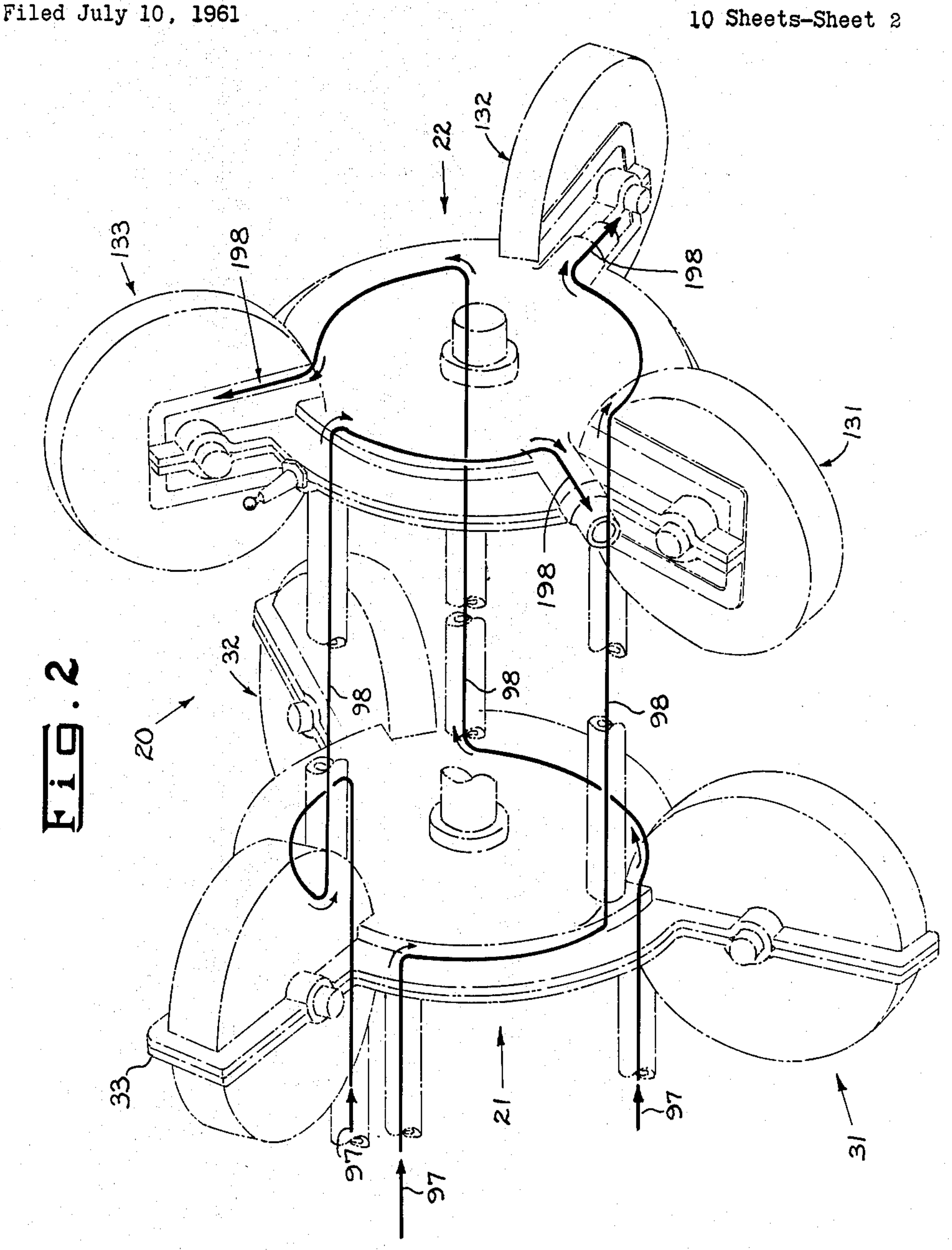
FIG. 2 is a perspective view similar to FIG. 1 but showing the structure in phantom dot-dash outline with heavy solid lines indicating the flow of fluid through the units.
Figure 3:
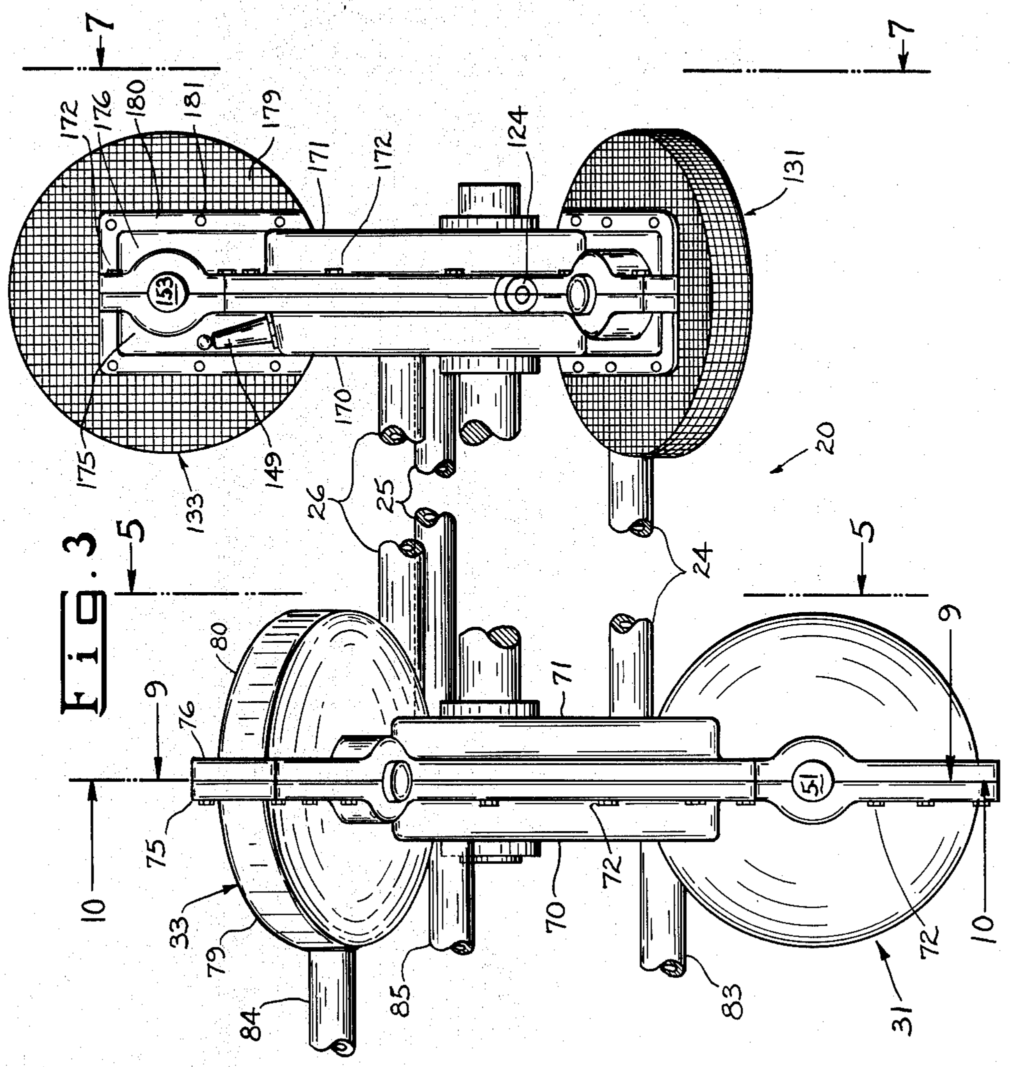
FIG. 3 is an elevational view of the device of FIG. 1. In order to obtain a full elevational view of one of the abutment disks.

FIGURE 2 provides an overall understanding of the continual compressing action of unit 21 during operation. As shown by the heavy flow lines in FIGURE 2, fluid will be drawn in at the left as indicated by portions 97 of the flow lines and delivered under pressure as indicated by portions 98 of the flow lines. As previously explained flow will occur simultaneously along two of the inlet lines and two of the outlet or compression lines. It is contemplated by the invention and will be understood by those skilled in the art that the number of abutment disks can be increased or decreased and that the number of large and small radius sections on all the disks can be increased or decreased.

Next the construction of the expansion unit 22 will be described, with particular reference to FIGURES 1 and 4. Since the expansion unit is quite similar to the compression unit, similar reference numerals in the 100 series will be applied to similar parts. For example, the compression unit has a power disk 30 whereas the expansion unit has a power disk 130. The expansion unit has abutment disks 131, 132 and 133. Power disk 130 is rigidly connected to shaft 23 by a key such as 134 shown in FIGURE 14. In FIGURE 1 the shaft 23 as well as conduits 24–26 are shown broken for clarity and also to indicate that the compression and expansion units can be moved closer together. In this regard it will be noted particularly in FIGURE 7, that the abutment disks of the expansion unit are oriented between the abutment disks of the compression unit so that the two units can be very closely coupled, even to the extent of sharing a common center casing wall.

Disk 130 has large radius sections or projections 135 and 136, and small radius sections or recessed portions 137 and 138. The large and small radius sections merge at beveled leading edges 140 (FIGURE 7) and 141 and at beveled trailing edges 142 and 143. The periphery of each large radius section is provided with gear teeth 144, and the periphery of each small radius section is provided with gear teeth 145. The expansion power disk 130 does not have any exhaust groove such as grooves 47 and 48 in the compression power disk 30, as will be hereinafter explained in more detail. However, the expansion chamber has spark plugs 149 which are not used in the compression unit.

The abutment disks 131, 132 and 133 of the expansion unit are rotatably mounted on short shafts 151, 152 and 153, respectively. The abutment disks of the expansion unit are identical with each other, and each has large radius sections or projections 155 and 156, and small radius sections or recessed portions 157 and 158. The large and small radius sections merge at beveled leading edges 159 and 160, and at beveled trailing edges 161 and 162. The periphery of each large radius section is provided with gear teeth 163, and the periphery of each small radius section is provided with gear teeth 164.

The casing for the expansion unit 22 comprises generally symmetrical half sections 170 and 171 shaped to provide an interior recess having walls closely fitting around the power disk 130. The shaft 23 is journaled in the center of casing sections 170 and 171, and projects through section 171 for attachment of a power take-off. The peripheries of the sections are flattened to provide bolting rims. The rim on section 170 is drilled and tapped to receive bolts 172 which are inserted through holes in the rim on sections 171 so as to be accessible from the end of the device. Section 170 is provided with three pairs of spaced supporting ears 175 as shown best in FIGURES 1 and 3, and section 171 is provided with three pairs of spaced supporting ears 176 as shown best in FIGURES 1, 3 and 7. The ears 175 and 176 are matched so that when casing halves 170 and 171 are joined the ears form bores for receiving the abutment disk shafts 151–153. The ears 175 and 176 also provide bolting rims secured together by bolts 172. A sealing gasket can be positioned between the bolting rims of the casing halves and supporting ears.

As in the case of the compression unit, the abutment disks on the expansion unit are not required to perform any compression against the power disk. Accordingly the abutment disks 131, 132 and 133 are not enclosed in the expansion unit casing and are only partially covered by the supporting ears 175 and 176. As distinguished from the compression unit, the expansion unit abutment disks are not covered by a solid casing for several reasons. More specifically, there is no need to protect against possible loss of unburned fuel, and there is a greater need for cooling in the expansion unit. Thus disks 131, 132 and 133 are permitted to operate in the open to create a flow of cooling fluid. It is desirable in some applications to place a protective perforated covering such as a screen 179 over the exposed portions of the abutment disks. The screen can be provided with a solid rim portion 180 for convenient attachment to the supporting ears by means of screws 181. The screen is not essential but is a personnel safety feature and protects the movable parts from damaging dirt particles. As will be understood by those skilled in the art, the beveled leading edges 159 and 160 on the abutment disks, as well as the teeth themselves, will create a fluid flow generally parallel to their axes of rotation. The combined effect of the three abutment disks is to create a flow rotating around the expansion unit casing in a counterclockwise direction as viewed from the right in FIGURES 1 and 4. Thus rotating flow will cool the engine by passing over the surface of the casing and the abutment disks. The cooling medium can be air and may be directed as desired, or the entire unit could be enclosed in a coolant filled container so that the abutment disks operate in a cooling bath. In any event the abutment disks serve to cool the casing as well as cool themselves by reason of their position outside the casing. The perforated cover 179 is sufficiently open to permit the cooling flow, and can be dispensed with where safety and cleanliness are otherwise provided for as in the case of a surrounding coolant container. In cases where heat is a greater problem than any possible loss of fuel, the abutment disks on the compression unit can also be provided with screen covers such as expansion unit covers 179, instead of the oversized solid covers 79 and 80.

Figures 7, 8:
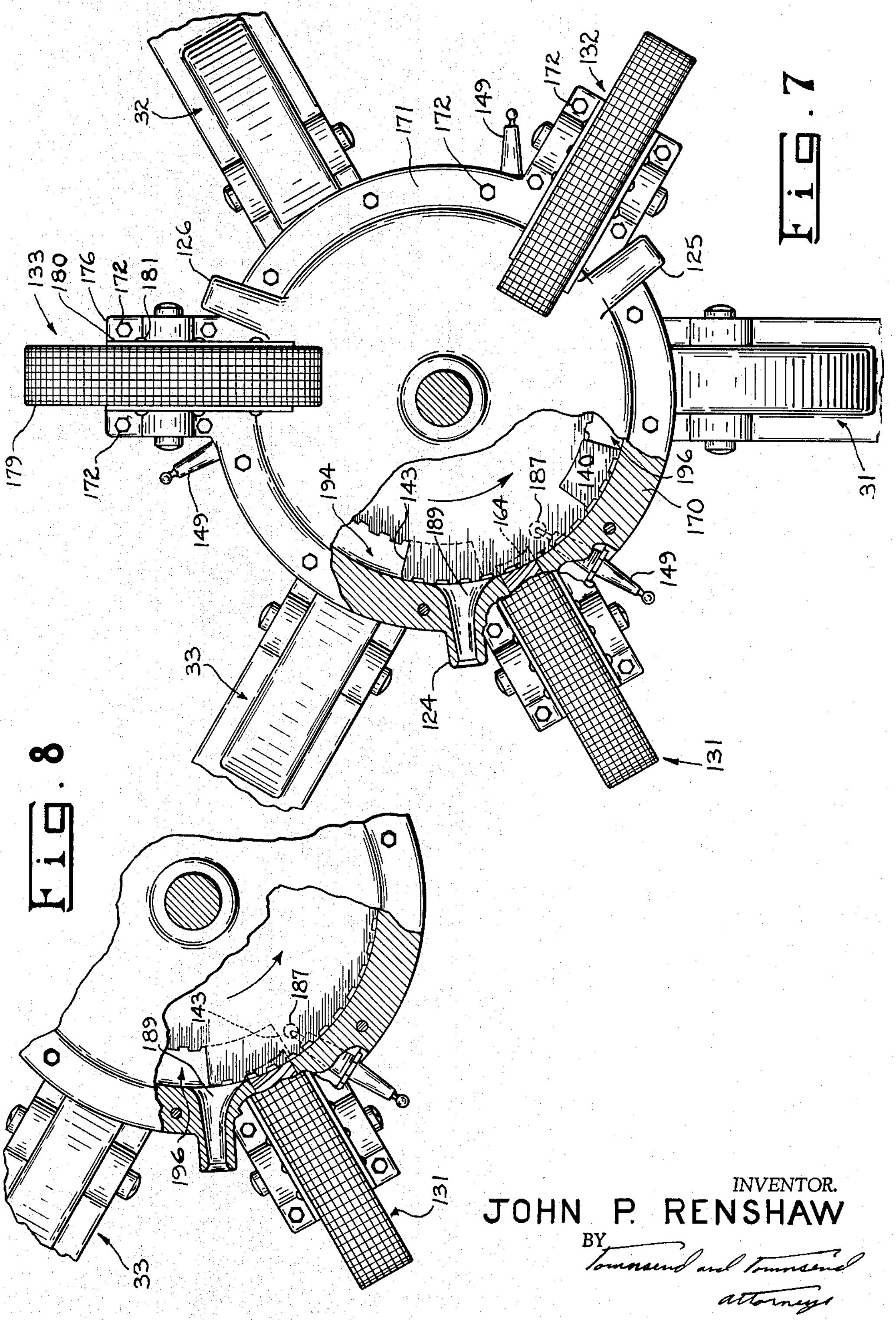
FIG. 7 is an end view of the expansion unit taken on the line 7—7 of FIG. 3, with the casing partially broken away.
FIG. 8 is a view similar to FIG. 7 showing the power disk in a different position.

The casing section 170 is connected by welding or other suitable means to the ends of connecting conduits 24, 25 and 26. It will be noted that since the outer casing sections 70 and 171 are removable for access to the power disks 30 and 130, the inner casing sections 71 and 170 can be joined by conduits 24–26 as an integral welded unit. Casing section 170 is drilled to provide inlet ports 187 as shown in FIGURES 1 and 7. As will be noted in FIGURES 1 and 7, the spark plugs 149 are positioned so that their electrodes project into the inlet ports 187 to avoid the wasted combustion space of a separate spark plug well, and so that when fixed, combustion starts near expansion unit, and proceeds backwards toward compressor. Any gas leakage in the expansion unit is the burned gases—not unburned. Casing sections 170 and 171 are formed to provide outlet or exhaust tubes 124, 125 and 126, each providing an outlet or exhaust port 189 as shown in FIGURE 7. The exhaust tubes can, of course, be joined by an exhaust manifold (not shown).

The operation of the expansion unit is as follows, with particular reference to FIGURES 1, 2, 4, 7 and 8. The rotation of the various disks is considered to be in the directions shown by the arrows in the figures. When trailing edge 142 or 143 of power disk 130 passes any of the abutment disks, it uncovers one of the inlet ports 187. At the same time an expansion chamber 194 is formed between the walls of the casing, a small radius section 137 or 138 of the power disk, a large radius section 155 or 156 on one of the abutment disks, and a trailing edge 142 or 143 on the power disk. More specifically, see expansion chambers 194 in FIGURES 4, 7 and 8. Obviously, if fluid under pressure is present in an expansion chamber 194 it will act against said trailing edge 142 or 143 to drive the power disk in the direction of the arrow.

Figure 16:
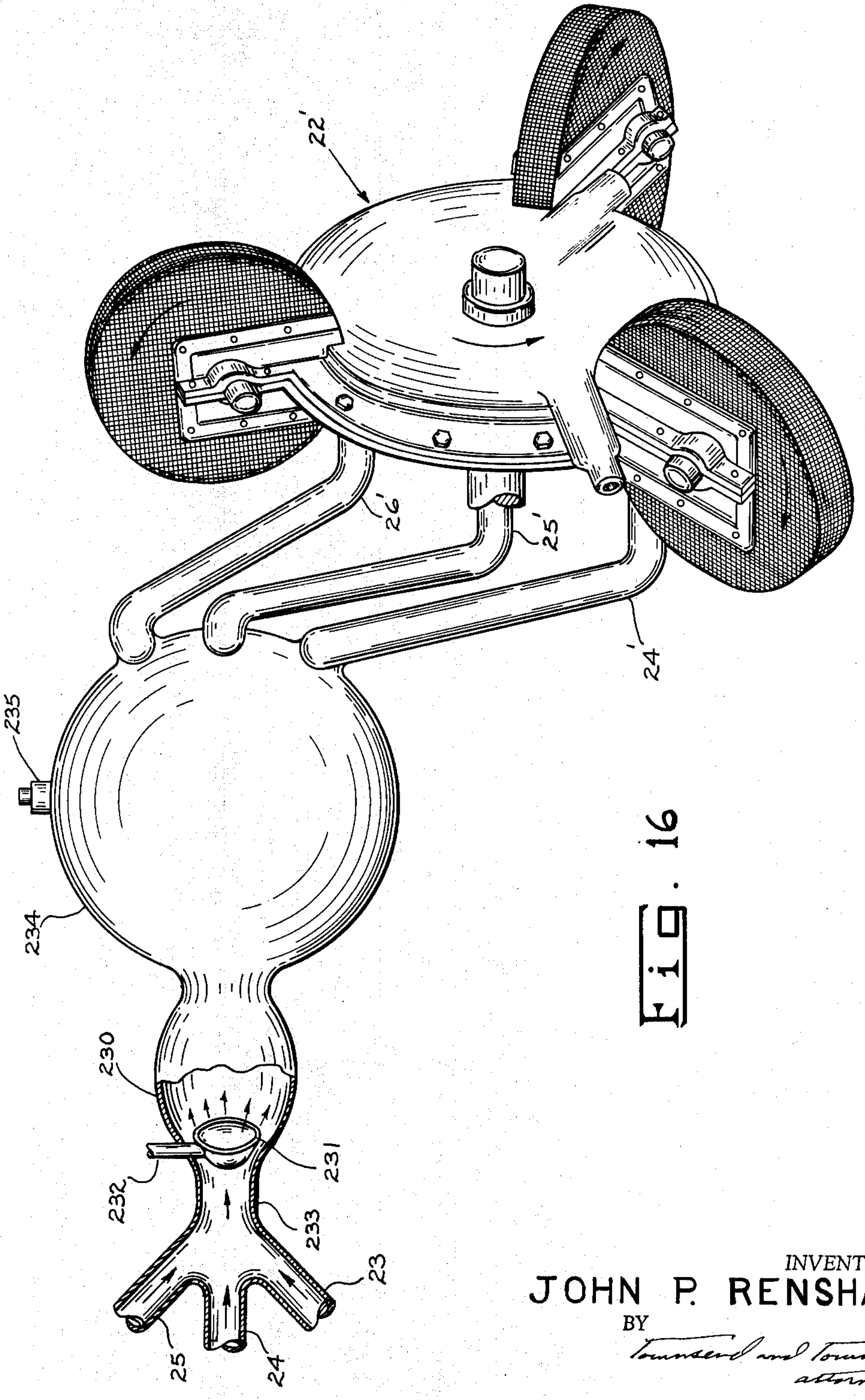
FIG. 16 is a view of an embodiment of the invention in which the expansion unit is connected to a continuous combustion chamber.

Fluid under pressure can, of course, be provided in a number of ways. As shown in the drawings, a compressed fuel mixture is delivered by the compression unit through conduits 24–26 and the spark plugs 149 ignite the mixture to provide a high pressure driving force. The timing of the spark plugs will be described in the following discussion. It should be understood that the fuel mixture could be supplied by compressors other than unit 21, although there are particular features of advantage in the combination of the particular compression and expansion units shown. Also, it will be understood that plain compressed air could be delivered to the expansion unit and fuel supplied by a separate fuel injection system. In addition water injection could be effectively employed in connection with the expansion unit. Further, it will be realized that other ignition means could be employed. For example, the expansion unit could operate at high enough temperature, at least at localized "hot spots," to cause combustion at the instant a highly compressed fuel mixture is admitted to the expansion chamber. Also, as shown in FIGURE 16, a continuous burning combustion chamber could be employed. Naturally, spark plugs 149 would not be used if an alternative combustion means is employed. Further, it will be apparent that the expansion unit can be driven by fluid pressure where the pressure is not created by combustion or where high pressure combustion occurs from the other means such as "rocket" fuel. In other words, the expansion unit could operate as a fluid motor as distinguished from a combustion engine. An example of this type of operation suggested by the figures would be the arrangement where the two lengths of shaft 23 remain unconnected and the compression power disk 30 is driven by an external power source. In this case, fluid from the compression unit would drive the expansion unit. If a noncompressible fluid were used the result would be a master-slave positive displacement pump-motor system. For this arrangement the output ports 89 in the compression unit would be moved radially outward to open continuously into the compression chambers so that the compression chambers would deliver continously instead of confining the fluid during the first part of the compression cycle.

Thus, when fluid under pressure is present in the expansion chambers 194 it will drive the power disk 130. As the power disk is rotated by this force, the trailing edges 142 or 143 of the expansion chambers will pass the next adjacent abutment disk at the end of the expansion cycle. The abutment disk will enter the expansion chamber and a compression or exhaust chamber 196 will be formed. The compression chamber is formed between the walls of the casing, the small radius section 137 or 138 of the power disk, the large radius section 155 or 156 on said next abutment disk, and a leading edge 140 or 141 on the power disks more specifically see compression chambers 196 in FIGURES 4 and 7.

FIGURES 7 and 8 show the power disk 130 in two positions to further illustrate the operation of the compression unit. FIGURE 7 shows the power disk in the same rotational position as in FIGURES 1 and 4. At this juncture it is helpful to note that in the compression unit the compression chamber formed at abutment disk 31 delivers through conduit 24 to the expansion chamber formed at abutment disk 131. Thus, when the leading edge 40 is in the position shown in FIGURES 1, 4 and 5, the compression cycle is not yet complete, therefore, trailing edge 143 has not yet opened the inlet port 187. When the compression power disk 30 has moved to the position shown in FIGURE 6 it has just completed the compression cycle and outlet port 89 is closed. At the same time the expansion power disk 130 will have moved to the position shown in FIGURE 8 where trailing edge 143 is just about to open the inlet port 187. As soon as the inlet port is uncovered by trailing edge 143, timing means (not shown) will ignite spark plug 149. The expanded gas is forceably expelled through outlet ports 189 by leading edge 140 or 141 during the exhaust cycle of the expansion unit.

Although the expansion and compression operation has been discussed with particular reference to operation on each side of abutment disk 131, it will be apparent from the drawings that the same operation occurs on each side of the other abutment disks 132 and 133. Obviously, the same operations do not occur simultaneously at all abutment disks. For example, in the positions shown in FIGURE 4, expansion or firing is taking place on one side of abutment disks 132 and 133, and compression or exhaust is occurring on the other side of disks 132 and 133. At the same time abutment disk 131 has its small radius teeth 164 engaged with the power disk and is therefore not forming the end of any chamber. As the power disk 130 continues to rotate, disk 133 will next be rotated to its inactive position and disk 131 will start to form the ends of expansion and compression chambers while disk 132 continues to do so. Continued rotation of the power disk will rotate abutment disk 132 to its inactive position while disks 131 and 133 are the active ones, and then the cycles will start over.

FIGURE 2 provides an overall conception of the continual operation of expansion unit 22 and its relation to compression unit 21. As shown by the heavy flow lines in FIGURE 2, the lower pressure fuel mixture will be drawn into the compression unit 21 as indicated by portions 97 of the flow lines; delivered under pressure as indicated by portions 98 of the flow lines; exploded and expanded in the expansion unit 22; and exhausted at relatively low pressure as indicated by portions 198 of the flow lines. More specifically, fuel mixture which enters adjacent to disk 33 will be compressed against disk 31, exploded against disk 131, and exhausted against disk 132. Fuel which enters adjacent to disk 31 will be compressed against disk 32, exploded against disk 132, and exhausted against disk 133. Similarly, fuel which enters adjacent to disk 32 will be compressed against disk 33, exploded against disk 133, and exhausted against disk 131.

In order to simplify the explanation of the operation of the units individually and in their cooperating relation, description of several important detail features has been postponed and will now be considered. Since the abutment disks are not fully sealed by the casing it can be particularly important to provide means for providing exceptionally good seals for the compression and expansion chambers. As shown best in FIGURES 9–11 circular sealing rings 200 and 201 are recessed in annular grooves 202 and 203 in casings 70 and 71. A plurality of short bores 204 and 205 (three being shown) open into the grooves and are provided with springs 206 and 207 for forcing the rings against the face of power disk 30 when received in the recess in the casing. It will be noted that ring 201 is of smaller diameter than ring 200 in order that ring 201 will be located inside the outlet grooves 47 and 48 in the face of disk 30. The ring 200 is large enough to be positioned just inside the small radius gear teeth 64. In the expansion unit the sealing rings in both casing sections are identical to each other. In addition, the sealing rings in the expansion unit are identical to the sealing ring 200 and therefore have not been separately shown.

Figures 11, 12, 13:
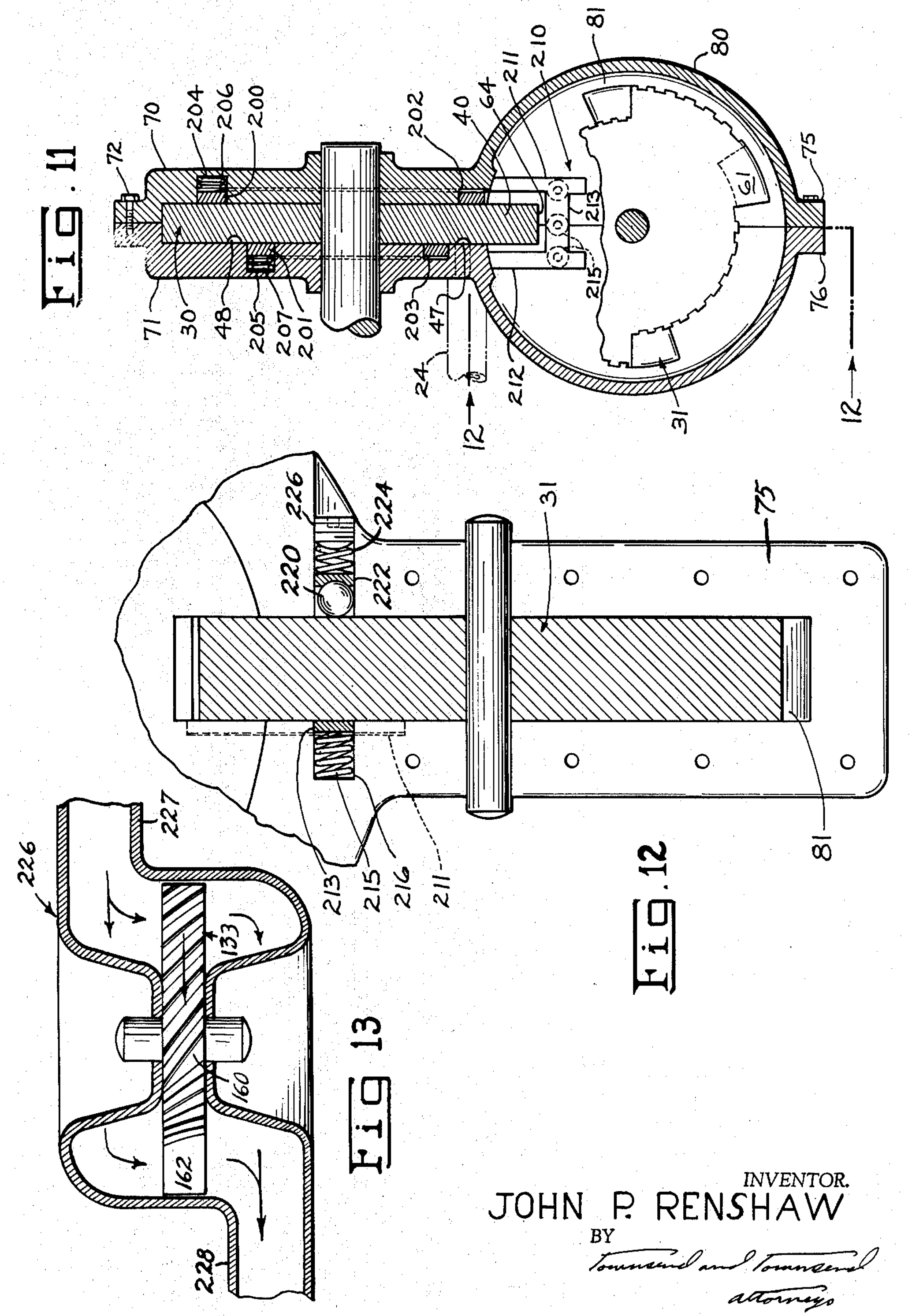
FIG. 11 is a cross-sectional view taken on the line 11—11 of FIG. 5.
FIG. 12 is an enlarged cross-sectional view taken on the line 12—12 of FIG. 11.
FIG. 13 is a cross-sectional view through a modified abutment disk casing shaped as a conduit for providing fluid thrust or supercharging.

Since the abutment disks are vented, it is conceivable that there will be a tendency for sight leakage between the abutment disks and their supporting casings. It should be remembered that the small radius portions of the abutment disks are intentionally vented and so there is no necessity for sealing these areas. The leakage problem is associated with the chambers inside the casing which are formed with the large radius sections of the abutment disks as one wall thereof. FIGURES 11 and 12 show a seal 210 for preventing leakage from said chambers past the faces of the abutment disks. Seal 210 is a generally U-shaped member having leg portions 211 and 212 which straddle the power disk 30 and having a connecting portion 213. Thus fluid which tends to escape along the face of the abutment disks will be blocked by the sealing member 210. The member 210 is received in a matching recess in the abutment disk supporting casing and is resiliently urged against the face of the abutment disk by three springs 215 received in spring wells 216. The sealing member 210 has been specifically described in connection with the compression unit, but it should be understood that exactly the same construction applies to the expansion unit. If necessary the sealing members 210 could be located on each side of each abutment disk in each of the units 21 and 22. However, since the expansion operation in the compression unit 21 is at relatively low pressure, it is possible to use a sealing member adjacent only one side of the compression unit abutment disks. Accordingly, the sealing members 210 in the compression unit are placed on the compression side of each abutment disk. In the expansion unit the expansion or combustion operation is the high pressure operation, and the sealing members 210 in the expansion are placed on the expansion side of each abutment disk. Thus, as viewed in FIGURE 7, the sealing members 210 will be on the counterclockwise side of expansion abutment disks 131–133 and on the clockwise side of the compression abutment disks 31–33.

Another feature of the invention involves a means for counteracting the fluid forces acting against the faces of the abutment disks. More specifically, enlarged FIGURE 12 shows a thrust bearing 220 which rotationally engages the sides of the compression abutment disks, such as disk 31, to counteract the force of the compressed fluid against the side of the abutment disk. The bearing 220 is carried in bearing holder 222 and may be resiliently urged against the face of abutment disk 31 by a spring 224. The casing halves are bored and threaded at their juncture to receive the bearings and threaded closure plugs 26 so that the thrust bearings can be inserted after the abutment disks and casing halves are assembled. Although the thrust bearings have been particularly described in connection with the compression unit abutment disk 31, it will be understood that exactly the same arrangement applies to the other compression unit abutment disks 32 and 33. The same arrangement also applies to the expansion abutment disks except that the bearings 220 would be on the opposite sides of the abutment disk. For example as viewed in FIGURE 7 the bearing would be on the left side of expansion abutment disk 131 whereas it is on the right side of compression abutment disks 31.

FIGURE 13 shows a modified form of abutment disk casing which can be substituted for the screen 179 or for the closed casing 79, 80. The modified casing is designated 226 and forms a conduit having an inlet end 227 and an outlet end 228. By way of example, abutment disk 133 is shown in the modified casing. When disk 133 is rotating in the direction of the arrow, it will create an air flow in the direction shown by the air flow arrows. Thus the air forced out at 228 can be usefully employed as for thrust, supercharging, or directed cooling flow.

Figure 15:
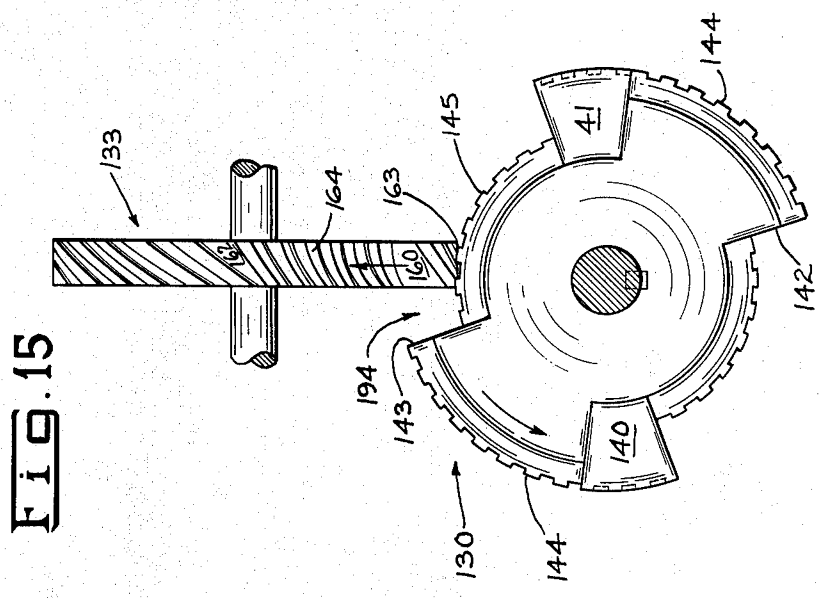
FIG. 15 is a side view of FIG. 14, showing the offset feature.

Two more of the stated objects will now be discussed in detail. These objects relate to the offset of the abutment disks and the concavity of the small radius teeth on all of the disks. Referring first to the offset feature, it will be noted in FIGURES 5 and 7 that the center plane of each abutment disk is located at one side of the axis of the power disk. FIGURE 15 also shows this offset very clearly. FIGURE 15 shows abutment disk 133 and expansion power disk 130 substantially as they would appear in FIGURE 7 with the casing removed and the disks rotated slightly. As will be noted in FIGURES 5, 7 and 15, the compression unit abutment disks are offset from the power disk axis in a counterclockwise direction, whereas the expansion unit abutment disks are offset in a clockwise direction. The reason for the difference is that it is desired to have full tooth engagement for sealing purposes adjacent the high pressure side of the abutment disks, and, of course, the high pressure occurs on one side of the compression abutment disk and on the other side of the expansion abutment disk. Thus, in FIGURE 5 the full tooth engagement occurs on the clockwise side of abutment disks 31, and in FIGURES 7 and 15 the full tooth engagement occurs on the counterclockwise side of abutment disks 131 and 133, respectively. This offset of the abutment disks provides a full line of tooth engagement and therefore a full seal at the place where it is needed and reduces friction by reducing the amount of tooth contact on the other side of the abutment disks where it is not necessary for sealing purposes.

Reference is now made to FIGURES 4, 6, 7 and 14 which show the concave gear tooth feature. In these figures it will be noted that the small radius teeth 45, 145 on the power disks and 64, 164 on the abutment disks are all concave, whereas the large radius teeth 44, 144, 63 and 163 are all flat. This arrangement provides a full line of tooth engagement and therefore provides a full seal. If all of the teeth were flat, the contact would be more in the nature of a point than a line. Although if the power disk is relatively thin, tooth design may give tooth seal between disks without concavity of the small radius sections. By making the small radius teeth concave, rather than the large radius, the surface of the casing which seals against the large radius teeth 44 and 144 on the power disks is a simple flat surface. This surface would have to be convex if the large radius teeth were concave. It should be understood that the turbulence caused by the large radius teeth as they pass along the adjacent surface of the casing provides an adequate seal. This phenomenon makes it unnecessary to have a tight, friction-creating contact between the large radius teeth and the casing.

In FIGURE 16 a previously mentioned embodiment is shown employing a constant burning type combustion chamber 230. The combustion chamber has a conventional cone 231 which is supported by and fed with fuel from an inlet line 232. Compressed air is introduced from conduits 23–25 which can be connected to the compression unit 21 of FIGURE 1 or to any other compressed air source. If a conventional non-positive displacement compressor were used as the source, a single inlet 233 would suffice. Further if a compressed fuel mixture is fed through inlet 233, the fuel line 232 would not be required. A suitable flame starter (not shown) is also a conventional part of cone 231. The combustion chamber 230 delivers high pressure burned gases into the buffer storage chamber 234 which can be provided with a conventional high pressure relief valve 235. High pressure gases from chamber 235 drive the expansion unit 22′ through inlet lines 24′–26′, Expansion unit 22′ is exactly the same as expansion unit 22 except that the spark plugs 149 can be dispensed with.

Although the foregoing invention has been described in some detail by way of illustration and example for purposes of clarity of understanding, it is to be understood that certain changes and modifications may be practiced within the spirit of the invention as limited only by the scope of the appended claims. Further, it should be understood that although all of the features of the invention have been disclosed in association with a device in which the disks are provided with gear teeth, many of the features are applicable to similar devices in which the peripheries of the disks are smooth, and separate gearing or other means is provided for driving the disks in synchronism.

I claim:

1. An improved positive displacement energy converting device comprising at least one casing, a power disk rotatably mounted in said casing, at least one abutment disk rotatably mounted on said casing with the periphery of said abutment disk being in sealing association with the periphery of said power disk during rotation of the disks, the axis of said abutment disk being substantially tangent to a circle around the axis of said power disk, means for rotating said abutment disk in synchronism with said power disk, said power disks and abutment disk each having at least one large radius section and at least one small radius section intermeshing during rotation of said disks, the improvement comprising means for venting the periphery of said small radius section of the abutment disk throughout rotation of the abutment disk, a compression chamber formed on one side of said abutment disk between the walls of said casing and said small radius section of the power disk and the large radius section of the abutment disk and the leading edge of the large radius section of the power disk, an expansion chamber formed on the other side of said abutment disk between the casing walls and the small radius section of the power disk and the large radius section of the abutment disk and the trailing edge of the large radius section of the power disk, a sealing member positioned on one side of said abutment disk between the abutment disk and said casing, said sealing member having leg portions straddling said power disk and a transverse portion connecting said leg portions radially outwardly of said large radius section of the power disk, and a sealing ring on each side of said power disk coaxial with the power disk between the face of the power disk and the walls of the casing.

2. An improved positive displacement energy converting device comprising a casing, a power disk and at least one abutment disk all rotatably mounted on said casing, the axis of said abutment disk being substantially tangent to a circle around the axis of said power disk, each of said disks having at least one large radius section and at least one small radius section with gear teeth on the periphey of all sections, said abutment disk being positioned with its gear teeth meshing with the teeth on the power disk, the improvement comprising a compression chamber formed on one side of said abutment disk between the walls of said casing and said small radius section of the power disk and the large radius section of the abutment disk and the leading edge of the large radius section of the power disk, an expansion chamber formed on the other side of said abutment disk between the casing walls and the small radius section of the power disk and the large radius section of the abutment disk and the trailing edge of the large radius section of the power disk, the peripheral surface formed by the teeth on said large radius sections being straight when said disks are viewed in cross-section, and the peripheral surface formed by the teeth on said small radius sections being concave when said disks are viewed in cross-section.

3. A positive displacement energy converting device comprising a compression casing and an expansion casing, a power disk rotatably mounted in each of said casings, a plurality of circumferentially spaced abutment disks rotatably mounted on each of said casings around the respective power disks, each of said disks having large radius and small radius sections with gear teeth on the periphery of all sections, the abutment disks on each casing being positioned with their teeth meshing with the teeth of the power disk in the respective casing, the axis of said abutment disks being substantially tangent to a circle around the axis of the respective power disk, said power disks being substantially coaxial with each other, drive shaft means interconnecting said power disks, an inlet port in each casing adjacent each abutment disk, an outlet port in each casing adjacent each abutment disk, conduit means connecting the outlet ports in said compression casing to the inlet ports in said expansion casing, and said casings being positioned with the abutment disks of one casing circumferentially spaced between the abutment disks of the other casing whereby said casings can be closely coupled along the axis of said power disks.

4. A positive displacement energy converting device comprising a compression casing and an expansion casing, a power disk rotatably mounted in each of said casing, a plurality of circumferentially spaced abutment disks rotatably mounted on each of said casings around the respective power disks, each of said disks having large radius and small radius sections, means for rotating the abutment disks in each casing in synchronism with the power disk in the same casing with said large and small radius sections on the abutment disks in each casing intermeshing with said large and small radius sections on the power disk in the same casing, the axis of said abutment disks being substantially tangent to a circle around the axis of the respective power disk, said power disks being substantially coaxial with each other, drive shaft means interconnecting said power disks, an inlet port in each casing adjacent each abutment disk, an outlet port in each casing adjacent each abutment disk, conduit means connecting the outlet ports in said compression casing to the inlet ports in said expansion casing, and said casings being positioned with the abutment disks of one casing circumferentially spaced between the abutment disks of the other casing whereby said casings can be closely coupled along the axis of said power disks.

References Cited by the Examiner

UNITED STATES PATENTS

| | | | |
|---|---|---|---|
| 597,709 | 1/1898 | Chaudun | 123—8 |
| 724,819 | 4/1903 | Crowley | 123—8 |
| 928,506 | 7/1909 | Driggs | 91—85 |
| 1,012,616 | 12/1911 | Dubus | 91—85 |
| 1,220,688 | 3/1917 | Sanders | 123—12 |
| 1,799,294 | 4/1931 | Gough | 123—8 |
| 2,273,754 | 2/1942 | Hand | 123—8 |
| 2,674,982 | 4/1954 | McCall | 123—13 |
| 2,722,201 | 11/1955 | Muse | 123—8 |
| 3,012,551 | 12/1961 | Renshaw | 123—13 |

FOREIGN PATENTS

| | | |
|---|---|---|
| 563,981 | 10/1923 | France. |

SAMUEL LEVINE, *Primary Examiner.*

RALPH H. BRAUNER, JOSEPH H. BRANSON, Jr., KARL J. ALBRECHT, *Examiners.*